April 18, 1950  R. F. VOLK  2,504,476
COLLECTING AND DUMPING ASSEMBLY
Filed July 16, 1947  2 Sheets-Sheet 1

INVENTOR
RALPH F. VOLK,
BY
ATTORNEY

April 18, 1950 R. F. VOLK 2,504,476
COLLECTING AND DUMPING ASSEMBLY
Filed July 16, 1947 2 Sheets-Sheet 2
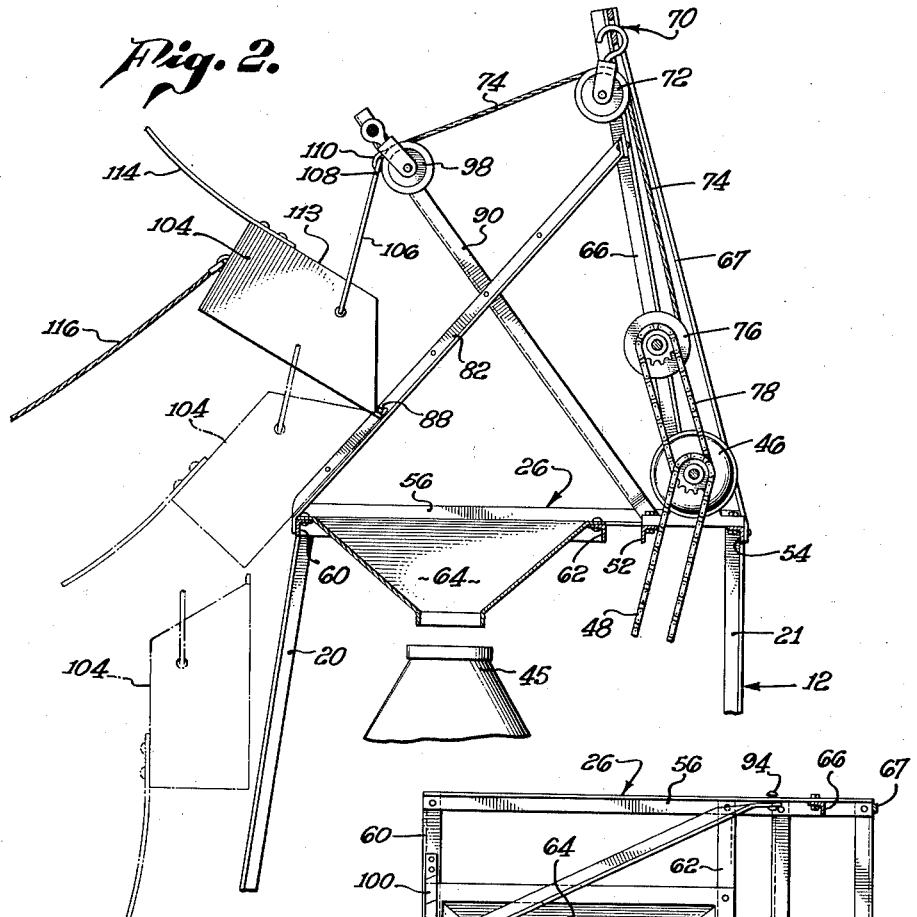
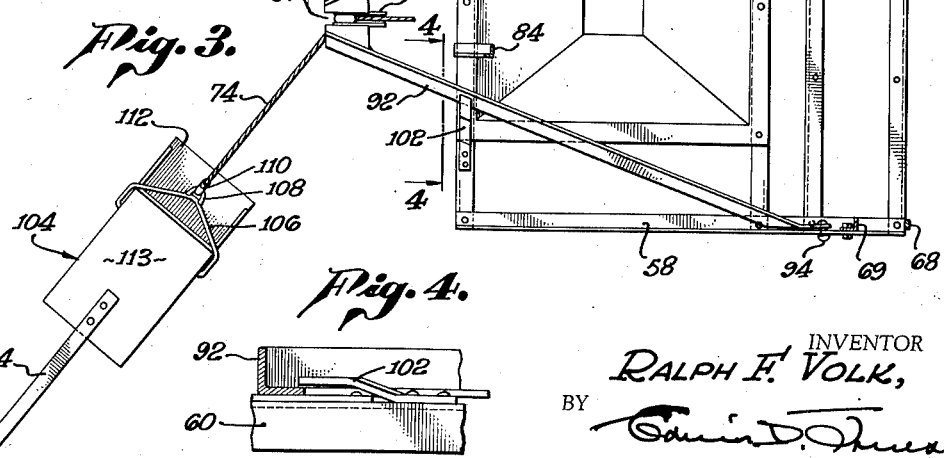
INVENTOR
RALPH F. VOLK,
BY
ATTORNEY Patented Apr. 18, 1950

2,504,476

UNITED STATES PATENT OFFICE 2,504,476

COLLECTING AND DUMPING ASSEMBLY

Ralph F. Volk, Midway City, Calif.

Application July 16, 1947, Serial No. 761,228

7 Claims. (Cl. 214—105)

This invention relates to an intermittent feed assembly, comprising a scoop element adapted to pick up and dump loose material into a bin or the like.

An object of the invention is to provide such a feed assembly in association with a cement mixer.

Another purpose is the provision of a scoop operated by a windlass and adapted to collect and bring aggregates or the like toward the radiation point of a fan shaped area, from which point the scoop is raised with continuous motion by self-centering suspension arms which thereafter locate the same in a guideway adjacent a tripping element, whereby the aggregates are dumped into a hopper or the like therebelow.

Other objects and advantages of the invention will be apparent from the following description and claims, the novelty consisting in the features of construction, combination of parts, the unique relations of the members and the relative proportioning, disposition, and operation thereof, all as more completely outlined herein and particularly pointed out in the appended claims.

In the drawings, which form part of the present specification:

Fig. 2 is a side elevational view of the upper portion thereof particularly showing the scoop in successive positions.

Fig. 3 is a top plan view of the unit particularly showing the scoop member operating from an off center position.

Fig. 4 is a horizontal sectional view taken along the line 4—4 of Fig. 3 and showing the mounting of one of the adjustable arms.

Figures 1, 5:
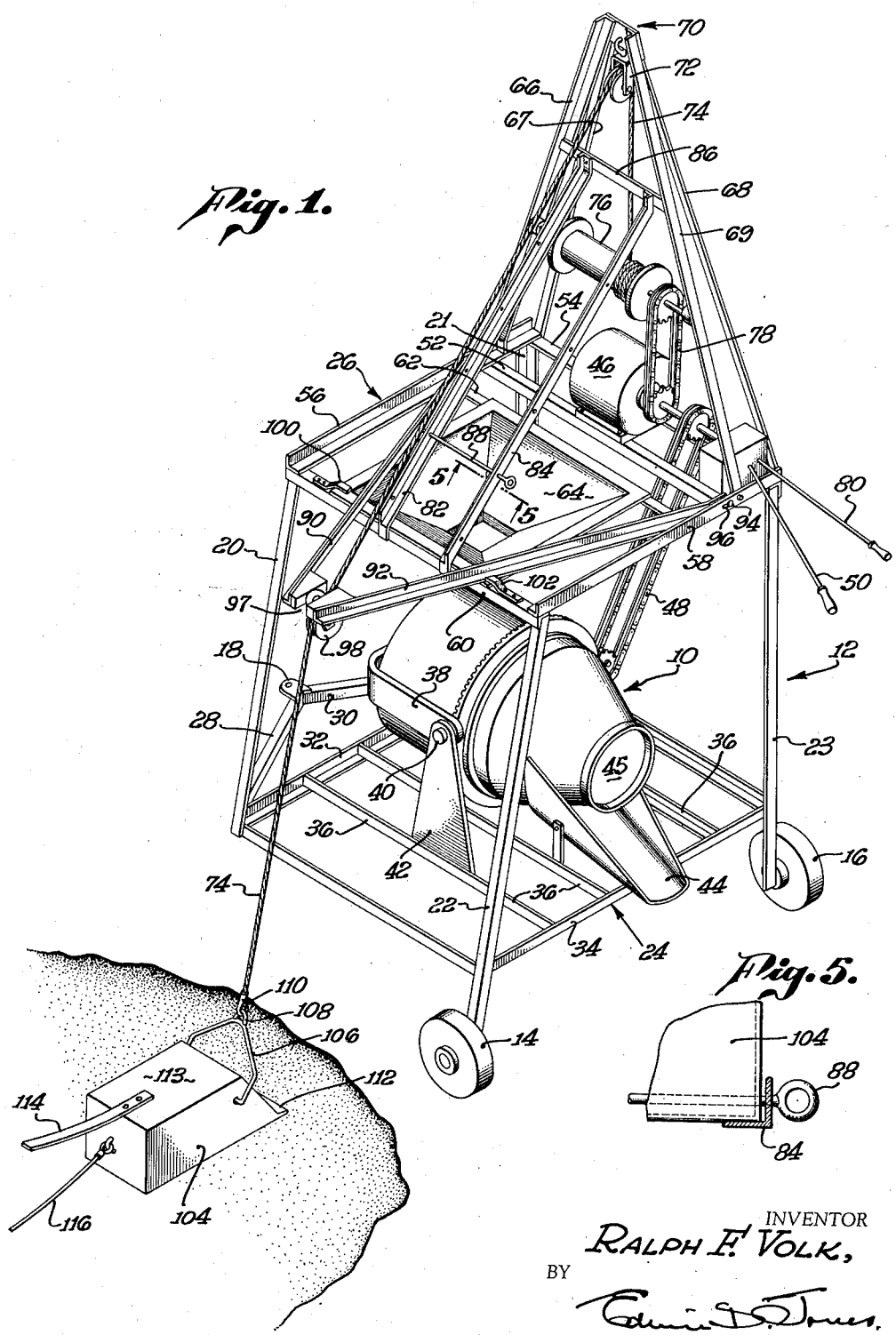
Fig. 1 is a perspective view of a portable cement mixer and feed attachment embodying my invention.
Fig. 5 is a transverse sectional view through an elevation rail taken along the line 5—5 of Fig. 1 and showing the scoop in dumping engagement with the cross pin.

My scoop and hoist assembly is here illustrated in association with a portable cement mixer 10 mounted on a generally cubical frame 12 and provided with a pair of rear wheels 14 and 16 and a forward attachment plate 18 for connection to a towing vehicle (not shown). Such a mixing unit can be towed from place to place as needed. However, my invention can be used also with a stationary mixer or an ordinary receiving bin, which may be movable as on a dump truck or can be stationarily located as desired.

As here depicted, the frame 12 is composed of four generally vertically disposed uprights 20, 21, 22, and 23, supporting a pair of horizontally disposed bracing assemblies 24 and 26 spaced apart by the uprights. The forward uprights 20, and 21, are connected at the lower end to a pair of horizontally disposed, outward converging arms 28 and 30 connected at their intersection to the attachment member 18; while the rear uprights 22 and 23 have secured to their lower ends, the wheels 14 and 16. The lower horizontal bracing assembly 24 comprises a front (32) and rear (34) L-shaped member between which are mounted jointly a series of cross rods 36 laterally spaced apart.

The mixer 10 is suspended within a yoke 38 by trunnions 40 journalled in a pair of upright brackets 42 which are secured at their lower ends to individual rods 36. A generally horizontal outlet funnel 44 is disposed so as to be beneath the mouth 45 of the mixer when the latter is in horizontal position as illustrated in Fig. 1. The mixer may be operated by a suitable motor 46 through connecting belts 48 controlled by an operating rod 50. The motor may be of any suitable type and is here shown mounted upon a pair of transverse supports 52 and 54 of the upper bracing assembly 26, laterally spaced apart and secured at their opposite ends to the L-shaped side arms 56 and 58. The cement mixer is capable of pivotal movement on the trunnions 40 between a horizontal and vertical position as well as a rotational mixing movement, both of which are conventional and need not be detailed here.

Suspended jointly between the upper horizontal side arm 60 of the upper supporting unit 26 and an intermediate cross arm 62 is a downwardly converging hopper 64 disposed so as to be above the mouth of the mixer 10 when the latter is in upright position. Accordingly, it will be appreciated that material such as sand, gravel, and cement are fed into the mixer through the hopper, and after mixing therein, they are emitted along the side funnel 44 upon tipping over the mixer.

Upon the upper face of the cubical frame 12 there is disposed a generally triangular superstructure comprising four angularly, upwardly converging struts 66, 67, 68, and 69, individually secured at their apex to a cross head 70 from which is suspended a pulley assembly 72, the cable 74 of which is wound on a windlass 76 which in turn is rotatably mounted between the forward struts 66 and 68, and may be operated from the motor 66 by a sprocket chain 78 controlled from the operating lever 80. A pair of inwardly facing, L-shaped parallel rails 82 and 84 which constitute a track or guideway for a scoop, as will later be described herein, are laterally spaced apart and angularly disposed between the side arm 60 and a cross bar 86 which is mounted between the forward struts 66 and 68 somewhat below the elevation of the pulley head 72. The upright arm of each L-rail is provided with a transversely aligned series of apertures spaced apart therealong so as to receive jointly therethrough a tripping pin 88 for a purpose which will be shortly evident.

A pair of outwardly facing L-shaped arms 90 and 92 are individually secured at one end respectively to the front and rear arms 56 and 58 of the upper horizontal brace 26 by means of a transverse pin 94 inserted jointly through an elongated slot 96 in each stationary arm. By means of these pin and slot connections the arms 90 and 92 are pivoted on the arms 56 and 58 to swing together about a horizontal axis from a horizontal position in which they repose on the side arm 60, upwardly to an inclined position. In addition the pin and slot connections 97 and 96 afford limited pivotal movement of the arms about an imaginary axis extending vertically between the arms which, in turn, allows limited lateral movement of the arms. Also, the connections permit forward and rearward sliding movement of the arms to occupy advanced and retracted horizontal positions.

At their converging ends the arms 90 and 92 are rigidly connected by a bridge member 97 in the form of a pair of blocks from between which a pulley 98 is suspended to swing from side to side. Over the pulley 98 is trained the cable 74.

Latching means in the form of a pair of oppositely disposed fingers 100 and 102 are fixed to the upper side of the slide arm 60 to alternately engage one arm 90 or the other arm 92 under lateral movement of the arms in one direction or the other, and to engage both of the arms in the advanced horizontal position of the arms, but not in the retracted position thereof. Thus the latching fingers 100 and 102 serve to retain the arms 90 and 92 in horizontal position until they are centered between the fingers and in horizontally retracted position.

At the outer end of the cable 74 is disposed a generally box-shaped, open-ended scoop 104 attached to the cable by a pivotally mounted tongue 106 having a central loop or eyelet 108 through which is received the cable hook 110. The bottom side of the scoop is forwardly protruding so as to form a transverse scraping lip 112 along its lead edge while the opposite side or top 113 of the scoop has attached thereto a resilient upwardly bent rudder member 114. Accordingly, it will be seen that the scoop may be drawn toward the frame 12 by the cable 74 as it is wound on the windlass 76 so that its forward lip 112 picks up sand or the like which is progressively pushed to the rear of the scoop.

The purpose of the rudder on the other hand is to prevent the scoop from being turned over or inverted as by it accidentally hitting a rock or other obstruction. A line 116 is secured to the bottom of the scoop in order to draw it back to its starting position. As the scoop is drawn up free of the ground by the windlass, the converging arms 90 and 92 center themselves between and free of the opposite engaging latching fingers 100 and 102 so that when the scoop is then drawn up adjacent the lower pulley 98, further movement of the windlass elevates in addition the supporting arms 90 and 92 so that the scoop then slides upward along the track rails 82 and 84 until its forward lip 112 abuts against the cross pin 88 which upon further movement of the scoop serves to tilt or trip the same whereby its contents are dumped into the hopper 64 and from there fall into the mouth of the mixer directly below, this tripping action being promoted by the off center attachment of the tongue 106. Should the pulling force exerted on the scoop 104 by the cable 74 in a scooping operation be centered with respect to the arms 90 and 92 rather than at an angle thereto, the arms will be pulled forwardly to an advanced position in which they engage beneath both of the fingers 100 and 102, to be latched by the fingers in horizontal position. However, when, in the lifting of the scoop, the eyelet 108 engages the pulley 98 the continued pull on the cable 74 serves to push the arms 90 and 92 to retracted position wherein they are moved free of the fingers 100 and 102 so that they can swing upwardly and guide the scoop onto the rails 82 and 84.

It will thus be seen that I have produced a highly effective scooping and dumping assembly which is in appreciable degree self-adjusting so that material may be gathered in from a considerable fan shaped area extending outward from the lower pulley 98.

In addition the elevating arrangement of the laterally adjustable arms 90 and 92, in association with the tripping pin serves to provide a continuous action or flow arranged to deliver the scopped-up material to the mixer, all of which is activated by a constant speeded windlass. It is important to note also that the L-shaped side rails 82 and 84 provide an automatic centering for the travelling scoop so that as it approaches and goes through the actual tipping operation it is at all times in alignment with the hopper beneath rather than at an angle, which might otherwise have been the case in the absence of such centering had it been drawn in from a pile of material to the side of the mixer.

Various modifications may be made in the structure and operation of my apparatus as will be apparent to those skilled in the art, it being my intention to claim the invention broadly as hereinafter defined and limited only by the prior art.

I claim:

1. A collecting and dumping assembly of the character described, comprising: an upright superstructure disposed above a bin or the like; an angular guideway supported adjacent said superstructure; a pair of mutually connected, laterally adjustable, swinging arms extending forward beyond said guideway from opposite sides thereof; a pulley mounted between said arms adjacent their converging point and spaced outward from said guideway; and a scoop element suspended from said pulley and adapted to be lifted onto said guideway by said swinging arms, said guideway being provided with longitudinally adjustable tripping means for said scoop element; said tripping means comprising a transverse pin insertable in aligned apertures of said guideway, and said scoop element being characterized by a forward extending engaging lip, said scoop being attached to said pulley by tongue means connected above its center, whereby the scoop on said guideway is tilted to dumping position by engagement of its lip with said pin.

2. The assembly of claim 1 wherein said scoop element is provided with a rearwardly extending rudder member disposed adjacent its upper surface.

3. A collecting and dumping assembly, including: a frame; a pair of arms mounted on said frame to normally occupy a substantially horizontal position thereon and to swing upwardly to an inclined position; a scoop tilting member on said frame between said arms; a scoop; and pulley and cable means on said frame and arms connected to said scoop for dragging the latter toward said arms and then lifting the scoop and arms to cause the scoop to engage said tilting member and dump the scoop.

4. A collecting and dumping assembly, including: a frame; a pair of arms mounted on said frame to normally occupy a substantially horizontal position thereon, and to swing to an inclined position upwardly thereon; a guideway on said frame between said arms; a scoop; pulley and cable means on said frame and said arms and connected to said scoop so as to be operable to drag said scoop toward said arms and then lift the same and said arms so that the scoop is positioned on and moved upwardly of said guideway; and means on said guideway engageable by said scoop for tilting the latter under movement thereof upwardly of the guideway.

5. A collecting and dumping assembly, including: a frame; a scoop; a guideway for said scoop on said frame; scoop tilting means on said guideway; scoop hoisting means including a cable operable to lift said scoop onto said guideway to engage said tilting means and for dumping of said scoop; and means on said frame operable in response to scoop lifting movement of said cable for centering the scoop in relation to said guideway so that it can move onto the latter in a position for dumping by said tilting means.

6. A collecting and dumping assembly, as embodied in claim 5, wherein said centering means comprises a pair of converging arms mutually mounted on said frame for upward swinging movement about a horizontal axis, and horizontal shifting movements about a vertical axis in either direction from a vertically centered position in relation to said guideway; and means on said frame engageable with said arms to restrain against swinging movement thereof except when they are in centered position thereof.

7. A collecting and dumping assembly, including: a frame; a guideway on said frame; a pair of mutually connected upwardly swingable arms extending forward beyond said guideway from opposite sides thereof; a pulley mounted between said arms and spaced outwardly from said guideway; scoop tilting means on said guideway; a pair of latches on said frame; said arms laterally shiftable horizontally in either direction from a position centered in respect to said guideway in which they are free to swing upwardly, to engage one latch or the other and thus be held against swinging; a scoop; and a cable trained over said pulley and connected to said scoop so that the latter is suspended therefrom; and means for actuating said cable to lift said scoop and to center said arms so that they may swing upwardly to move said scoop onto said guideway and into engagement with said tilting means for tilting the scoop.

RALPH F. VOLK.

REFERENCES CITED

The following references are of record in the file of this patent:

UNITED STATES PATENTS

| Number | Name | Date |
|---|---|---|
| 1,431,104 | Draeger | Oct. 3, 1922 |
| 1,694,355 | Royer | Dec. 4, 1928 |
| 1,761,801 | Robb | June 3, 1930 |
| 2,060,867 | Hollerbach | Nov. 17, 1936 |
| 2,268,568 | Cook | Jan. 6, 1942 |
| 2,327,473 | Wagner et al. | Aug. 24, 1943 |

FOREIGN PATENTS

| Number | Country | Date |
|---|---|---|
| 734,299 | France | July 26, 1932 |